United States Patent [19]

Van Gerwen et al.

[11] 3,737,778

[45] June 5, 1973

[54] DEVICE FOR THE TRANSMISSION OF SYNCHRONOUS PULSE SIGNALS

[75] Inventors: Petrus Josephus Van Gerwen; Willem Harmsen, both of Emmasingel, Eindhoven, Netherlands

[73] Assignee: U.S. Philips Corporation, New York, N.Y.

[22] Filed: Nov. 4, 1971

[21] Appl. No.: 195,889

Related U.S. Application Data

[62] Division of Ser. No. 728,706, May 13, 1968.

[52] U.S. Cl. ..................325/322, 325/320, 325/321, 178/88, 329/104

[51] Int. Cl. ..............................................H04b 1/16

[58] Field of Search.................................178/66, 88; 179/15 BV, 15 FS, 15 BP, 15 BS; 325/38 R, 30, 49, 50, 42, 328–330, 320–326, 474, 476, 341, 346, 419, 444; 329/50, 102, 104

[56] References Cited

UNITED STATES PATENTS

| | | | |
|---|---|---|---|
| 3,479,598 | 11/1969 | Weller | 329/104 |
| 3,417,332 | 12/1968 | Webb | 178/66 R |
| 3,474,341 | 10/1969 | Crafts et al. | 178/66 R |
| 3,233,181 | 2/1966 | Calfee | 325/30 |
| 3,376,511 | 4/1968 | Brothman et al. | 325/320 |

*Primary Examiner*—Albert J. Mayer
*Attorney*—Frank R. Trifari

[57] ABSTRACT

A receiver for a synchronous pulse signal formed with the clock, carrier, and shift frequencies having mutual ratios of integers. The receiver has two channels controlled by a clock pulse generator synchronized to a received signal and followed by a pulse regenerator. The receiver is well suited for an embodiment using integrated circuits.

3 Claims, 12 Drawing Figures

INVENTORS
PETRUS J. VAN GERWEN
WILLEM HARMSEN
BY
Frank R. Trifari
AGENT

INVENTORS
PETRUS J. VAN GERWEN
WILLEM HARMSEN
BY
AGENT

INVENTORS
PETRUS J. VAN GERWEN
WILLEM HARMSEN
BY
AGENT

Patented June 5, 1973 3,737,778

8 Sheets-Sheet 4

INVENTORS
PETRUS J. VAN GERWEN
WILLEM HARMSEN
BY
Frank R. Trifari
AGENT

INVENTORS
PETRUS J. VAN GERWEN
WILLEM HARMSEN
BY
AGENT

Patented June 5, 1973 3,737,778

8 Sheets-Sheet 6

INVENTORS
PETRUS J VAN GERWEN
WILLEM HARMSEN
BY
AGENT

INVENTORS
PETRUS J.VAN GERWEN
WILLEM HARMSEN
BY
AGENT

INVENTORS
PETRUS J. VAN GERWEN
WILLEM HARMSEN
BY
AGENT

DEVICE FOR THE TRANSMISSION OF SYNCHRONOUS PULSE SIGNALS

This is a division, of application Ser. No. 728,706, filed May 13, 1968.

The invention relates to a device for the transmission of synchronous pulse signals comprising a source for pulses the instants of occurrence of which coincide with a series of equidistant clock pulses, a switching modulation device controlled by a carrier oscillator and an output filter.

An object of the invention is to provide a new conception of a device for the transmission of synchronous pulse signals of the type mentioned in the preamble, said device being distinguished by its special flexibility, namely because it is possible, without modifications in structure, to adjust as desired at:

different speeds of transmission, for example, 200, 600, 1,200 or 2,400 Baud;

different frequency location of the information band within an alotted transmission channel, for example, in a channel of 300–3,000 c/s at bands around carriers of 600, 1,200, 1,800 or 2,400 c/s;

different methods of modulation, for example, amplitude modulation, vestigual sideband modulation, single sideband modulation, frequency modulation or phase modulation;

output signals of more than two levels.

A further object of the invention is to provide a device which in spite of this exceptional flexibility is simple in structure and is particularly suitable for solid-state integration.

The device according to the invention is characterized in that the output filter is formed by a digital filter including a shift register having a number of shift register elements, the content of which are shifted under the control of a shift pulse generator, the shift frequency of the shift pulse generator, the carrier frequency of the carrier oscillator and the clock frequency of the synchronous pulse signals being derived from a single central pulse generator.

The original synchronous pulse signals can be recovered from the output signals of the device according to the invention, using the method of demodulation associated with the relevant method of modulation, succeeded by a sampling of the demodulated signals and a pulse regeneration. If the clock frequency, the carrier frequency and the shift frequency are chosen to be such that the mutual ratio of these frequencies is always an integer, then it is found that the structure of the receiver can be simplified in a surprising manner. In fact, it is possible to recover the original pulse signals by means of one and the same receiver, independently of the method of modulation used and even under strongly varying operating conditions, without using the demodulation device corresponding to the method of modulation used, said receiver being characterized in that it includes two channels connected in parallel which are both provided with a sampler controlled by a clock pulse generator and an adjustable reference voltage source connected to the sampler, one of the samplers being preceded by an inverter which inverts the signals applied thereto in polarity, while the output signals of the samplers are applied to a pulse regenerator in the form of a bistable trigger.

Due to the remarkable flexibility of the transmission device according to the invention, a transmission of the synchronous pulse signals is realized which may be adapted in an optimum manner to the properties of an arbitrary transmission channel, for example, transmission characteristics and interference level, without modification of the structure of the transmission device by suitable adjustment of the speed of transmission, the frequency location of the information band and the method of modulation, the optimum adaptation once adjusted also being retained in case of varying operating conditions, for example, with variations of the frequency of the central pulse generator.

In order that the invention may be readily carried into effect, it will now be described in detail, by way of example, with reference to the accompanying diagrammatic drawings, in which:

FIG. 1 shows a transmission device according to the invention, while

FIG. 10 shows the frequency diagrams associated there with;

Figure 1:
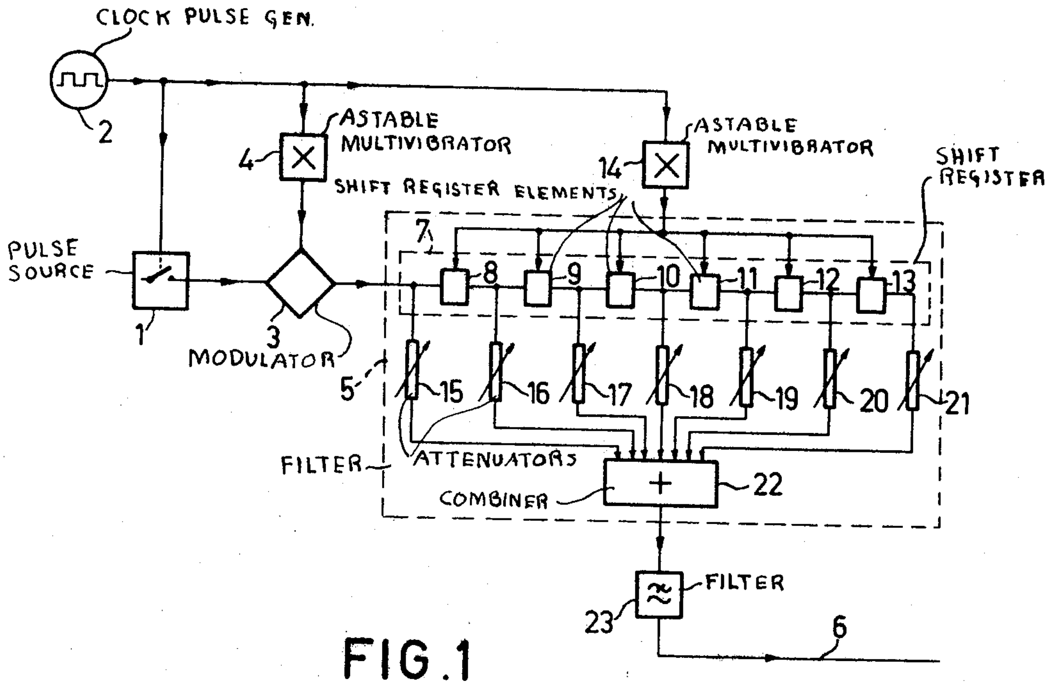

FIG. 1 shows a device for the transmission of bivalent synchronous pulse signals in a prescribed frequency band in a transmission channel of, for example, 300 – 3,000 c/s at a speed of transmission of, for example, 600 Baud. The bivalent pulses which originate from a pulse source 1 and the instants of occurrence of which coincide with a series of equidistant clock pulses which are derived, for example, from a clock pulse generator 2, are applied as modulation signal to a switching modulating device 3 in order to amplitude-modulate therein the carrier oscillation originating from a carrier oscillator 4. In the embodiment described, the clock frequency $f_b$ is 600 c/s while the carrier oscilator 4 is formed by an astable multivibrator which supplies a carrier oscilation at a frequency $f_s$ of, for example, 1,800 c/s. The modulated signals are passed on for further transmission to a transmission line 6 through an output filter 5.

In order to obtain a particularly flexible transmission device, the output filter 5 according to the invention is formed by a digital filter including a shift register 7 having a plurality of shift register elements 8, 9, 10, 11, 12, 13, the contents of which are shifted under the control of a shift pulse generator 14, the shift frequency $f_d$ of the shift pulse generator 14, the carrier frequency $f_c$ of the carrier oscilator 4 and the clock frequency $f_b$ of the synchronous pulse signals being derived from a single central pulse generator.

In the embodiment shown the shift pulse generator 14 is also formed by an astable multivibrator which supplies shift pulses to the shift register 7 at a pulse repetition frequency $f_d$ of, for example, 7,200 c/s corresponding to a shift period $d$ of 0.14 m sec, while the central pulse generator is formed by the clock pulse generator 2, the clock pulses of which are used for synchronisation of the carrier oscilator 4 and of the shift pulse generator 14 both constructed as a multivibrator, so that the carrier frequency $f_c$ and the shift frequency $f_d$ are derived from the clock frequency $f_b$ by means of frequency multiplication by factors 3 and 12, respectively in the astable multivibrators 4, 14 acting as frequency multipliers. Furthermore, the shift register elements 8, 9, 10, 11, 12, 13 in the digital filter 5 are connected through adjustable attenuation networks 15, 16, 17, 18, 19, 20, 21 to a combination device 22 from which the output signals of the transmission device are derived. In this embodiment the shift register 7 includes, for example, a plurality of bistable triggers.

With the aid of the digital filter 5, a desired transfer function of the transmission device is realized by suitably measuring the transfer coefficients of the attenuation networks 15, 16, 17, 18, 19, 20, 21 at a certain shift period $d$, as will now be proved mathematically.

A starting point for the mathematic elaboration is an arbitrary component of angular frequency $\omega$ and amplitude A in the frequency spectrum of the pulse signals applied to the shift register 7, which component may be indicated in complex writing by:

$$Ae^{j\omega t} \quad (1)$$

In the successive shift register elements the relevant spectrum component is shifted over time intervals $d$, $2d$, $3d$, $4d$, $5d$, $6d$, which spectrum component shifted over these time intervals may be written as:

$Ae^{j\omega(t-d)}$, $Ae^{j\omega(t-2d)}$, $Ae^{j\omega(t-3d)}$, $Ae^{j\omega(t-4d)}$, $Ae^{j\omega(t-5d)}$, $Ae^{j\omega(t-6d)}$.

Said spectrum component is applied to the combination device 22 through the relevant attenuation networks 15, 16, 17, 18, 19, 20, 21, the transfer coefficients of which are $C_{-3}$, $C_{-2}$, $C_{-1}$, $C_0$ $C_1$, $C_2$, $C_3$, respectively, thus resulting in an output signal:

$$C_{-3}Ae^{j\omega t}+C_{-2}Ae^{j\omega(t-d)}+C_{-1}Ae^{j\omega(t-2d)}+C_0Ae^{j\omega(t-3d)}+C_1Ae^{j\omega(t-4d)}+C_2Ae^{j\omega(t-5d)}+C_3Ae^{j\omega(t-6d)} \quad (2)$$

An arbitrary component $Ae^{j\omega t}$ in the frequency spectrum of the pulse signals applied to the shift register 7 yields an output signal as in formula (2) so that for the transfer function H($\omega$) of the digital filter 5 applies:

$$H(\omega)=C_{-3}+C_{-2}e^{-j\omega d}+C_{-1}e^{-2j\omega d}+C_0e^{-3j\omega d}+C_1e^{-4j\omega d}+C_2e^{-5j\omega d}+C_3e^{-6j\omega d}$$

or $$H(\omega)=C_{-3}e^{3j\omega d}+C_{-2}e^{2j\omega d}+C_{-1}e^{j\omega d}+C_0+C_1e^{-j\omega d}+C_2e^{-2j\omega d}+C_3e^{-3j\omega d}\, e^{-3j\omega d} \quad (3)$$

If it is desired to obtain, for example, a transfer function $H(\omega)$ having an arbitrary amplitude-frequency variation and a linear phase-frequency variation the attenuation networks are chosen pairwise equal starting from the ends of the shift register 7, the transfer coefficients $C_k$ of the attenuation networks satisfying the expression:

$$C_{-k} = C_k \text{ for } k = 1, 2, 3. \quad (4)$$

Combination of the terms having the same transfer coefficients in formula (3) for the transfer function $H(\omega)$ then gives:

$$H(\omega)= C_3(e^{3j\omega d}+e^{-3j\omega d})+C_2(e^{2j\omega d}+e^{-2j\omega d})+C_1(e^{j\omega d}+e^{-j\omega d})+C_0\, e^{-3j\omega d}$$

in which the amplitude-frequency characteristic $\Psi(\omega)$ is given by:

$$\Psi(\omega)=C_0+2C_1\cos \omega d + 2C_2\cos 2\omega d + 2C_3\cos 3\omega d \quad (5)$$

and the phase-frequency characteristic $\phi(\omega)$ is represented by: $\phi(\omega) = -3\omega d$. (6)

With this choice of the transfer coefficients it is found that by variation of the transfer coefficients the amplitude-frequency characteristic $\Psi(\omega)$ may assume any desired shape, whereas the phase-frequency characteristic $\phi(\omega)$ has a linear variation independent of said variation. As a result the pulse signals applied to the digital filter 5 may be filtered in any desired manner without introducing phase distortion.

The foregoing considerations may be extended to a shift register 7 having an arbitrary number of shift register elements. For example, when extending this number to $2N$ the amplitude-frequency characteristic has the shape of:

$$\Psi(\omega)=C_0 + \sum_{K=1}^{N} 2\, C_K \cos K\omega d \quad (7)$$

and the phase-frequency characteristic shows a purely linear variation in accordance with:

$$\phi(\omega) = -N\omega d \quad (8)$$

According to formula (7) the amplitude-frequency characteristic $\Psi(\omega)$ forms a Fourier-series developed in cosine terms the periodicity $\Omega$ of which is given by:

$$\Omega\, d = 2\,\pi \quad (9)$$

If a certain amplitude characteristic $\Psi(\omega)$ is to be realized, the coefficients $C_k$ in the Fourier-series (7) can be determined with the aid of the expression:

$$C_K = 1/\Omega_0{}^{\Omega}\, \Psi(\omega) \cos K\omega d\, d\omega \quad (10)$$

The shape of the amplitude-frequency characteristic is fully determined thereby, but the result of the periodical behaviour of the Fourier-series (7) is that the desired amplitude-frequency characteristic is repeated at a periodicity $\Omega$ in the frequency spectrum, thus creating additional pass regions of the transmission device. Said additional pass regions are not disturbing in practice, since in case of sufficiently high value of the periodicity $\Omega$ which, in accordance with formule (9) means: at a sufficiently small value of the shift period $d$, the frequency distance between the desired pass region and the additional pass regions is sufficiently large so that said additional pass regions can be suppressed by a simple suppression filter 23 at the output of the combination device 22 without influencing in any way the amplitude-frequency characteristic and the linear phase-frequency characteristic in the desired pass region. The suppression filter 23 in FIG. 1 is formed, for example, by a lowpass filter consisting of a resistor and a capacitor.

A substantial extension of the applications is obtained in that the inverted pulse signals can also be derived from the shift register elements, for example, with the aid of inverter stages or of the shift register elements themselves, since in the construction of the shift register elements with bistable triggers the inverted pulse signals also appear at the bistable triggers in addition to the pulse signals. Thus it becomes possible to realize negative coefficients $C_k$ in accordance with formula (10) in the Fourier-series.

The use of this step furthermore provides the possibility of realizing an amplitude-frequency characteristic $\Psi(\omega)$ developed in sine terms with a linear phase-frequency characteristic. If the attenuation networks are made equal pairwise as in the foregoing, starting from the ends of the shift register, and if furthermore the transfer coefficient $C_0$ of the attenuation network 18 is made zero, but if the inverted pulse signal is applied to the attenuation networks 19, 20, 21 in contrast with the foregoing, so that the transfer coefficients $C_k$ of the attenuation networks now satisfy the formula:

$$C_{-k} = -C_k \text{ for } k = 1, 2, 3 \quad (11)$$

then it is possible to write for the transfer function $H(\omega)$:

$$H(\omega) = C_3(e^{3j\omega d} - e^{-3j\omega d}) + C_2(e^{2j\omega d} - e^{-2j\omega d}) + C_1(e^{j\omega d} - e^{-j\omega d})\, e^{-3j\omega d}$$

or $$H(\omega) = (2C_1 \sin \omega d + 2C_2 \sin 2\omega d + 2C_3 \sin 3\omega d)\, je^{-3j\omega d} \quad (12)$$

The amplitude-frequency characteristic $\Psi(\omega)$ is now given by:

$$\Psi(\omega) = 2C_1 \sin \omega d + 2C_2 \sin 2\omega d + 2C_3 \sin 3\omega d \quad (13)$$

and the phase-frequency characteristic $\phi(\omega)$ by: $\phi(\omega) = -3\omega d + \pi/2$ (14)

The linear phase-frequency characteristic according to formula (14) shows a phase shift $\pi/2$ relative to that of formula (8). The foregoing considerations can again be extended to an arbitrary number 2N of shift register elements, in which it then applies that:

$$\Psi(\omega) = \sum_{K=1}^{N} 1C_k \sin Kwd$$

$$\phi(\omega) = -N\omega d + \frac{\pi}{2} \quad (15)$$

$$C_k = \frac{1}{\pi}\int_0^{\pi} \Psi(\omega) \sin kwd\, dw$$

By suitable choice of the transfer coefficients of the attenuation networks any arbitrary amplitude-frequency characteristic can be realized in this manner with a linear phase-frequency characteristic.

Thus that transfer function can be given to the digital filter 5 that is desired for various methods of modulation such as, for example, amplitude modulation with two side bands vestigial sideband or singleband by suitably adjusting only the attenuation networks 15–21 at a certain shift period $d$.

Characteristic of the transmission device according to the invention is the congruent variation of the adjusted transfer function with the clock frequency $f_b$, that is to say, if the clock frequency $f_b$ changes by a certain factor both the carrier frequency $f_c$ and the shift frequency $f_d$ change by the same factor with the result that on a frequency scale changed by the same factor the amplitude-frequency characteristic retains its original form and also the phase-frequency characteristic retains its linear variation.

If the transfer function is adjusted in accordance with the Nyquist criterion for obtaining an output signal of the digital filter 5 exactly assuming the amplitude values of the original pulse signals of the pulse source 1 at the instants of occurrence of the clock pulses of clock frequency $f_b$, then the transfer function remains satisfying said Nyquist criterion, even with variations of the clock frequency $f_b$, thus always ensuring an optimum adjustment of the transfer function for recovering original pulse signals.

In the foregoing the relation between clock frequency $f_b$, carrier frequency $f_c$ and shift frequency $f_d$ has been chosen to be such that an integral number of periods $m$ of the carrier frequency $f_c$ occurs per period of the clock frequency $f_b$ and that an integral number of periods $n$ of the shift frequency $f_d$ occurs also per period of the carrier frequency $f_c$, or in a formula:

$$f_b : f_c : f_d = 1 : m : mn. \quad (16)$$

In fact, it is found that with this relation of $f_b$, $f_c$ and $f_d$ the remarkably simple receiving device of FIG. 2 can always be utilized for the reliable recovering of the original pulse signals independently of the method of modulation applied in the transmission device of FIG. 1, as will be explained hereinafter with reference to time diagrams.

Figure 2:
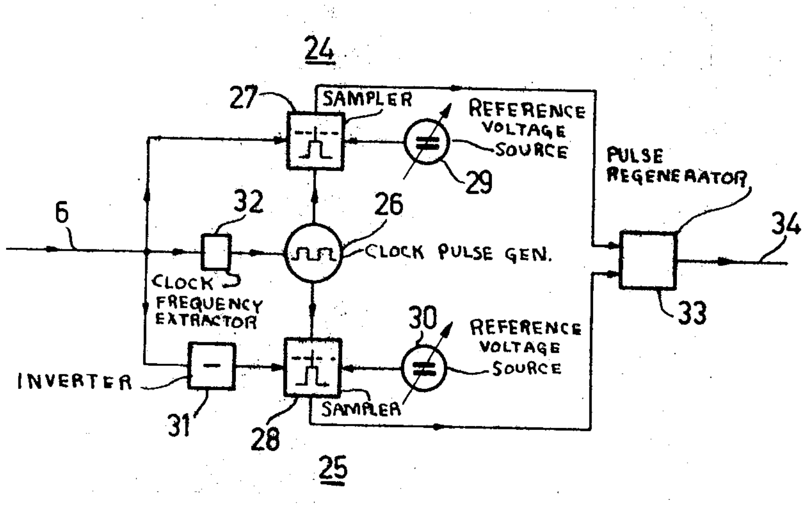
FIG. 2 shows a receiving device which may be used in the various methods of transmission with the aid of the device in FIG. 1.

The modulated pulse signals received through transmission line 6 in the receiving device of FIG. 2 are applied through two channels 24, 25 connected in parallel to samplers 27, 28 controlled by a clock pulse generator 26 to each of which a reference voltage source 29, 30 is connected, the sampler 28 being preceded by an inverter 31 which inverts the signals applied thereto in polarity. The received signals are also applied to a clock frequency extractor 32 for extracting the clock frequency $f_b$ from the received signals for synchronisation of the clock pulse generator 26.

For recovering the original bivalent synchronous pulse signals the outputs of the two samplers 27, 28 are connected to a pulse regenerator 33 in the form of a bistable trigger, the original pulse signals being derived from the output line 34 of the bistable trigger 33. At the instant of occurrence of a clock pulse from the clock pulse generator 26, only that sampler 27 or 28 for which the received signal lies above the reference level of the relevant reference voltage source 29 or 30 will produce an output pulse which is applied to the bistable trigger 33 for further handling; particularly the one stable state of the bistable trigger 33 is associated with the occurrence of an output pulse of the sampler 27 and the other stable state with the occurrence of an output pulse of the sampler 28.

The original pulse signals are recovered in this manner from a direct sampling of the modulated pulse signals with a series of sampling pulses of frequency $f_b$, thus always ensuring optimum receiving conditions, because the received modulated pulse signals still satisfy the said Nyquist criterion in case of variations of the clock frequency in the transmission device of FIG. 1. Independent of the method of modulation applied the receiving device of FIG. 2 can always be utilized for recovering the original pulse signals, it only being necessary to adjust the reference level of the reference voltage sources 29, 30 at a suitable value for the various methods of modulation, as will further be explained hereinafter with reference to the time diagrams of FIGS. 3 and 5 and the frequency diagrams of FIG. 4.

For completeness sake it is to be noted in this respect that the phase-reliable recovering of the clock pulses from the received signals, besides from the modulated pulse signals themselves by means of the clock frequency extractor 32, may also take place by using a pilot signal cotransmitted with the modulated pulse signals, but these methods of recovering the clock frequency $f_b$ are of lesser importance for the present invention.

The invention will now be explained with reference to the time diagrams in FIGS. 3 and 5 and the frequency diagrams in FIG. 4.

Figure 3:
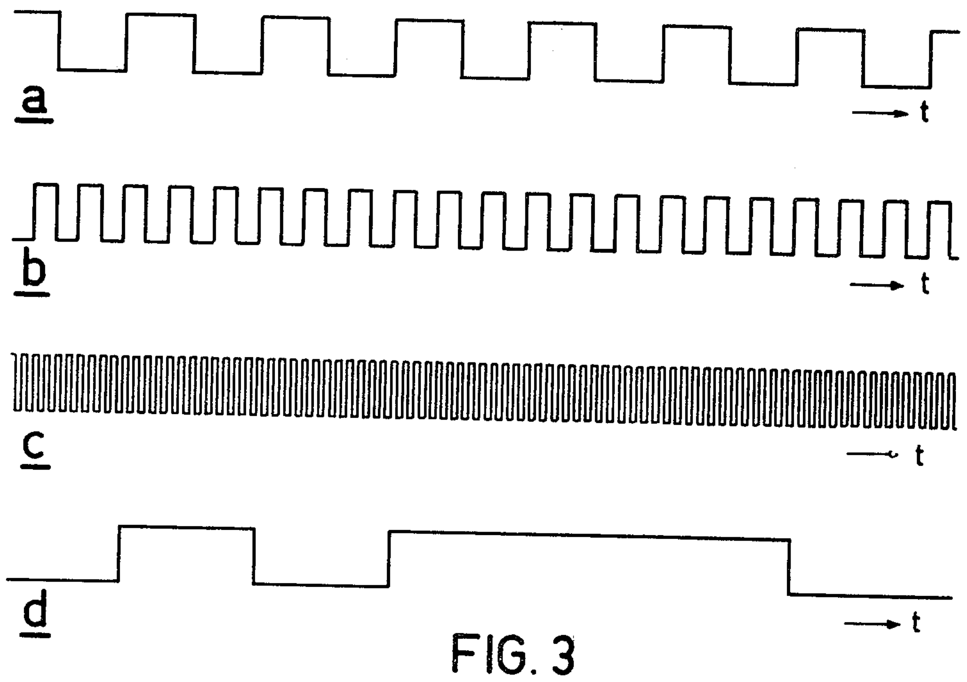
FIG. 3 shows a few time diagrams and FIG. 4 shows a few frequency diagrams for explanation of the operation of the device of FIG. 1.

FIG. 3 shows at *a* the clock pulses having a frequency $f_b = 600$ c/s, at *b* and *c* the carrier oscillation having a frequency $f_c = 1,800$ c/s, and the shift pulses having a frequency $f_d = 7,200$ c/s which are derived from the clock frequency $f_b$ by frequency multiplication by factors 3 and 12, respectively, while at *d* is indicated a series of synchronous pulse signals to be transmitted at a speed of transmission of 600 Baud.

Figure 4:
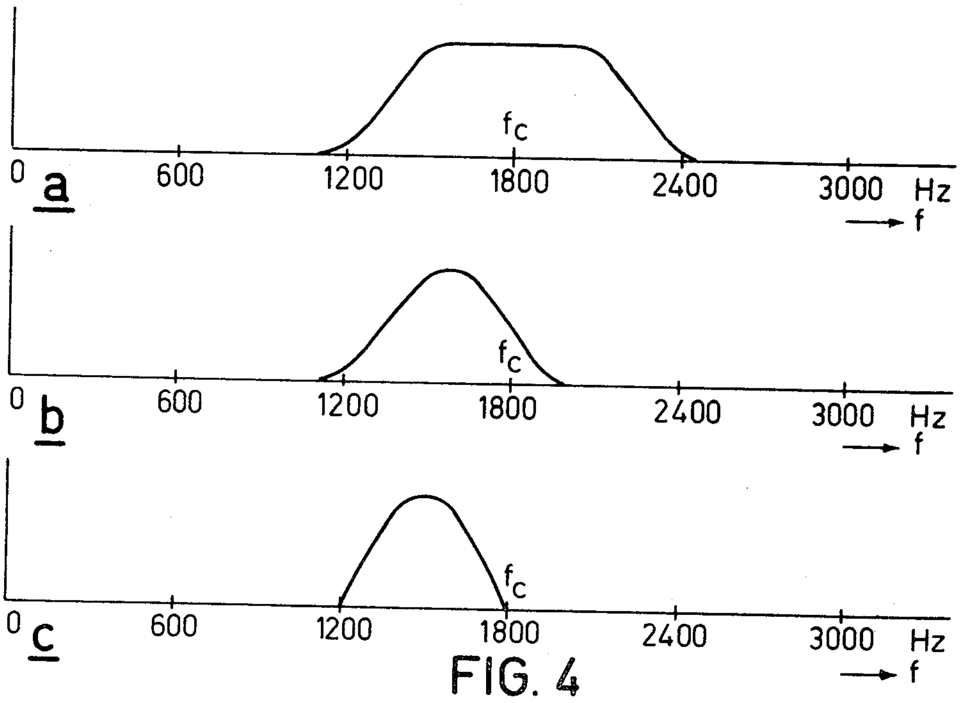

FIG. 4 illustrates Examples of amplitude-frequency characteristics of the digital filter 5 for the transmission of the modulated pulse signals obtained by modulation of the carrier oscillation *b* in FIG. 3 with the synchronous pulse series *d* in FIG. 3 and this for the transmission through two sidebands on either side of the carrier frequency $f_c = 1,800$ c/s at a, through a lower sideband and a vestigial sideband at *b* and through a single sideband at *c*. To that end the shift register in the embodiment shown is extended to 28 elements and the number of adjustable attenuation networks to 29 while for realizing the amplitude-frequency characteristics shown in FIG. 4 with a linear phase-frequency characteristic the transfer coefficients $C_k$ of the attenuation networks at the shift frequency $f_d = 7,200$ c/s are chosen as follows: for *a* in FIG. 4 in accordance with the formula:

$$C_k = [\sin (k\pi/8)\cos(7k\pi/16)/k\pi(1-k^2/64)]+\lambda [\sin(k\pi/8)\cos(9k\pi/16)/k\pi(1-k^2/64)]$$
$$k = -14, -13, \text{-------}, +13, +14 \quad (17)$$

for *b* in FIG. 4 in accordance with the formula:

$$C_k = [\sin (k\pi/8)\cos(7k\pi/16)/k\pi(1-k^2/64)];\ k = -14, -13, \text{------}+13, +14 \quad (18)$$

for *c* in FIG. 4 in accordance with the formula:

$$C_K = [\cos(k\pi/12) \sin (5k\pi/12)/3\pi(1-k^2/36)]$$
$$K = -14, -13, \text{-----}+13, +14 \quad (19)$$

Figure 5:
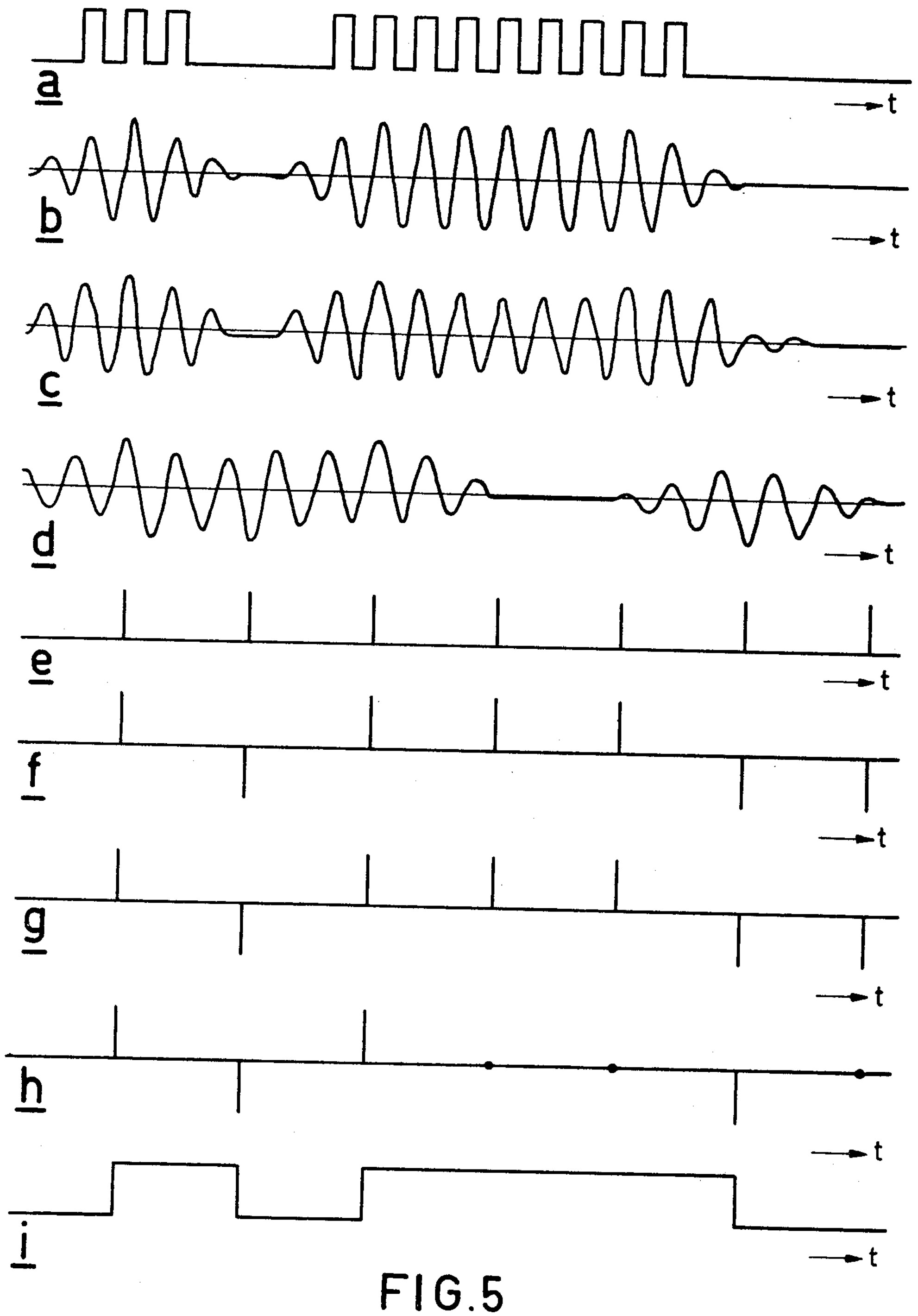
FIG. 5 and FIG. 6 show a few time diagrams for illustration of the use of the device of FIG. 1 in case of amplitude modulation and phase modulation, respectively.

When the switching modulating device 3 is constructed as an AND-gate in which the carrier oscillation *b* of FIG. 3 is supplied to one input and the synchronous pulse series *d* of FIG. 3 is supplied to the other input, the amplitude-modulated pulse signal shown at *a* in FIG. 5, which is applied for further transmission to the digital filter 5, is produced at the output of the AND-gate. If in that case the amplitude-frequency characteristic of the digital filter 5 has successively the form illustrated at *a*, *b* and *c*, respectively, in FIG. 4, the modulated pulse signals such as are shown at *b*, *c* and *d* in FIG. 5 appear at the output of the transmission device of FIG. 1.

The original pulse signal from the pulse source 1 (compare *d* in FIG. 3) can always be covered from the modulated pulse signals *b*, *c* and *d* in FIG. 5 with the aid of the receiving device shown in FIG. 2. In fact, by directly sampling these modulated pulse signals *b*, *c* and *d* in the samplers 27, 28 with the series of sampling pulses of clock frequency $f_b$ =600 c/s shown at *e* in FIG. 5 and by suitably adjusting the reference voltage sources 29, 30 the sampling signals are produced at *f*, *g* and *h*, respectively, in FIG. 5, the sampling signals of the sampler 27 being illustrated by positive pulses and those of sampler 28 by negative pulses exclusively as distinctions in the Figure; in the transmission device of FIG. 2 the sampling signals from the samplers 27, 28 show a similar, for example, positive polarity. In order to recover the sampling signals *f*, *g* and *h* from the modulated pulse signals *b*, *c* and *d*, the reference voltage sources 29 and 30, respectively, are adjusted at a positive voltage of half the nominal pulse value for the modulated pulse signals *b*, and a negative voltage of nominal the nominal pulse value, respectively, for the modulated pulse signal *c* at a positive voltage of half the nominal pulse value and a negative voltage of half the nominal pulse value, respectively, and for the modulated pulse signal *d* both at a positive voltage of half the nominal pulse value. The sampling signals *f*, *g* and *h* thus obtained all supply the original pulse signal after regeneration in the pulse regenerator 33 as is shown at *i* in FIG. 5 (compare *d* in FIG. 3).

Figure 6:
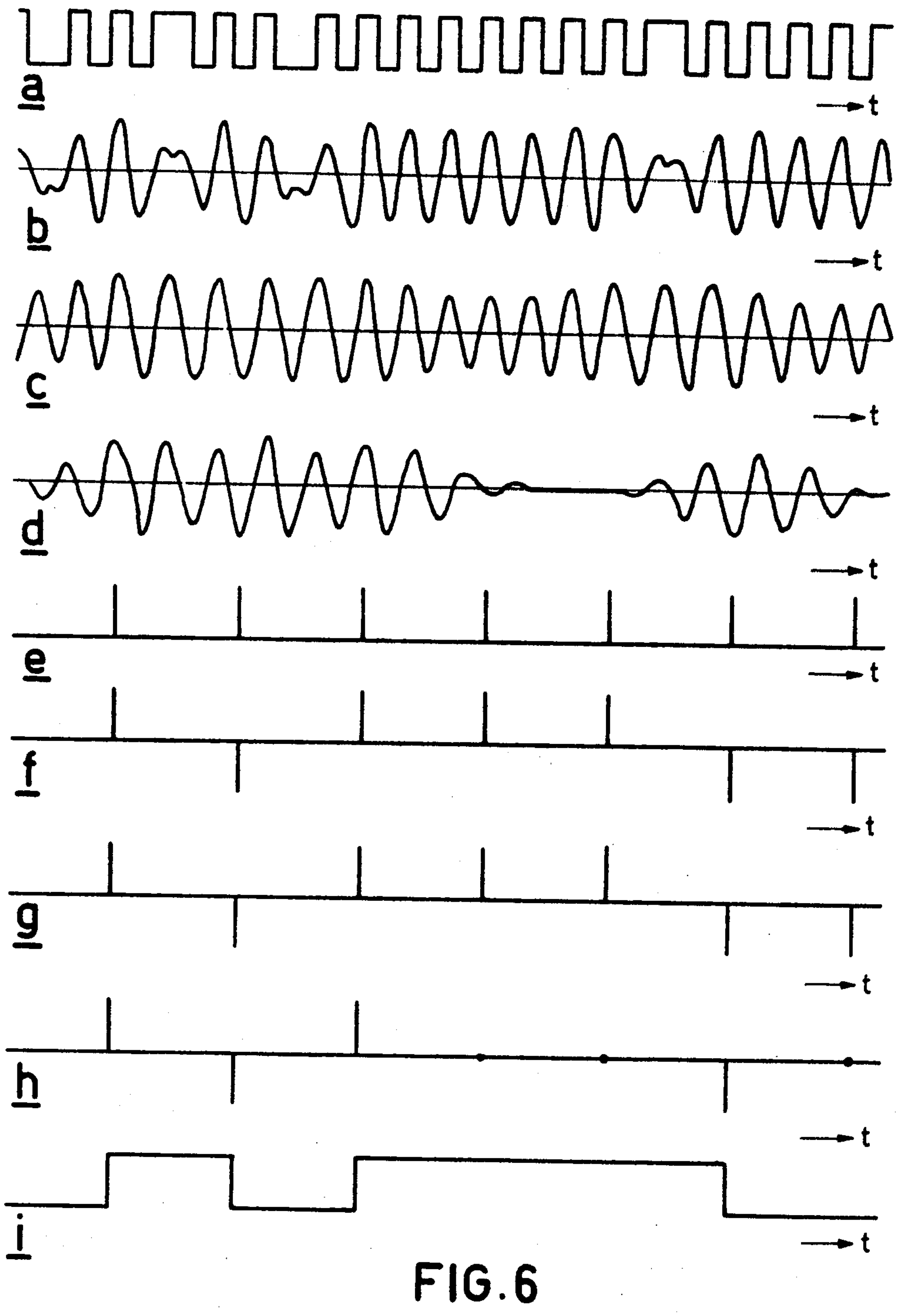

The switching modulating device 3 of FIG. 1 may alternatively be constructed as a modulo-2-adder instead of an AND-gate. If again the carrier oscillation *b* of FIG. 3 is connected to one input of the modulo-2-adder, and the synchronous pulse series *d* of FIG. 3 to the other input, the pulse signal shown at *a* in FIG. 6 is produced at the output of the modulo-2-adder. Since a modulo-2-adder produces a "O" output if both inputs are equal in polarity and a "1" if they differ, pulses from the carrier oscillation *b* occur both in the absence and in the presence of a pulse of the pulse series *d* to be transmitted. However, if a sudden phase change occurs in the waveform of FIG. 3*d*, a phase case of change also occurs in the waveform of FIG. 6*a*. Therefore, said pulse signal *a* represents the carrier oscillation *b* phase-modulated by the pulse series *d* to be transmitted. The supply of said phase-modulated pulse signal *a* to the digital filter 5, the amplitude-frequency characteristic of which has successively the form illustrated in FIG. 4 at *a*, *b* and *c*, then causes the modulated pulse signals shown in FIG. 6 at *b*, *c* and *d* to be produced at the output of the transmission device of FIG. 1. Also in this case the original pulse signal from pulse source 1 (compare *d* in FIG. 3) can be recovered with the receiving device of FIG. 2, as is illustrated in FIG. 6, in which at *e* the series of sampling pulses of clock frequency $f_b = 600$ c/s are shown. If the two reference voltage sources 29, 30 are adjusted to a voltage zero at the modulated pulse signals *b* and *c* and the two reference voltage sources 29, 30 at a positive voltage of half the nominal pulse value at the modulated pulse signal *d* then the sampling signals shown at *f*, *g* and *h* are produced by direct sampling of the pulse signals *b*, *c* and *d* with the pulse series *e*, said sampling signals all yielding the original pulse signal as shown at *i* (compare *d* in FIG. 3) after regeneration in the pulse regenerator 33.

The transmission device according to the invention may, however, also be used for the transmission of the synchronous pulse signals by means of frequency modulation in the form of "frequency shift keying" in which the receiving device of FIG. 2 can also be advantageously utilized for recovering the original pulse signals if the two carrier frequencies $f_{c1}, f_{c2}$ simultaneously satisfy the ratio between clock frequency $f_b$, carrier frequency $f_c$ and shift frequency $f_d$ described hereinbefore. To this end the carrier frequencies $f_{c1} = 1,200$ c/s and $f_{c2} = 1,800$ c/s are chosen in the transmission of the synchronous pulse signal at a speed of transmission of 600 Baud, while the shift frequency $f_d = 7,200$ c/s as in the foregoing. The transmission device is shown in FIG. 7 in this embodiment in which elements in FIG. 7 corresponding to FIG. 1 are indicated by the same reference numerals.

Figure 7:
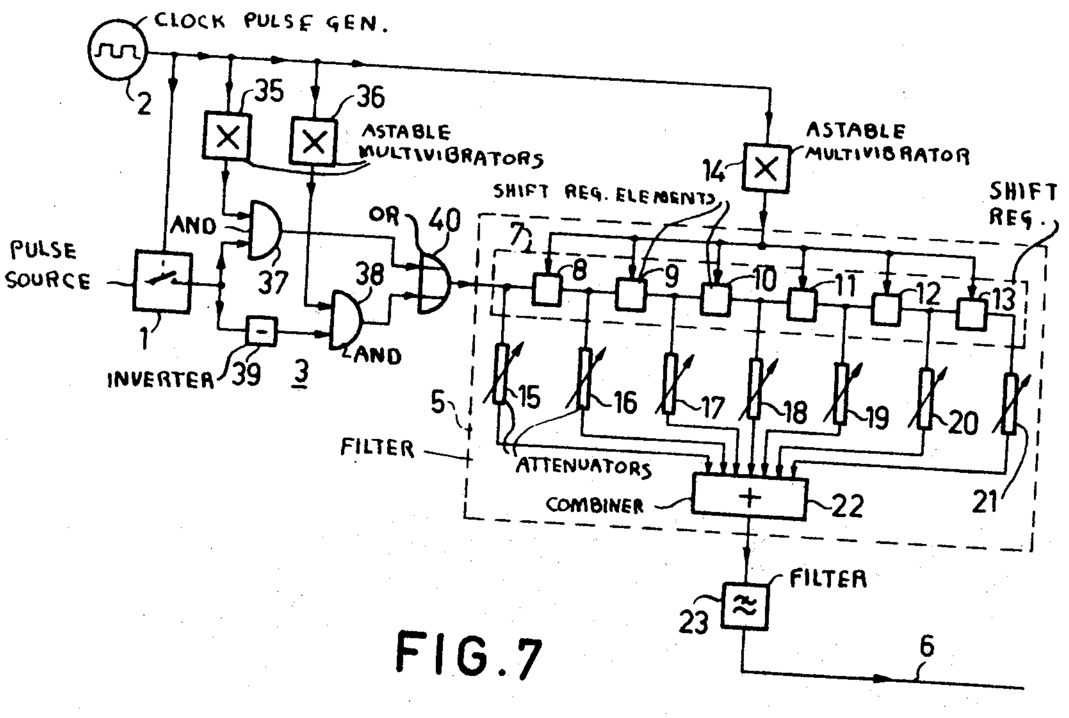
FIG. 7 shows an embodiment of the device of FIG. 1 adapted for transmission with the aid of frequency modulation while a few time diagrams are shown in FIG. 8 for explanation of FIG. 7, FIG. 9 and FIG. 11 show modifications of the device of FIG. 1

The switching modulating device 3 in FIG. 7 is fed by two carrier oscillators 35, 36 which are both constructed as frequency multipliers in the form of astable multivibrators to which the clock pulses from the clock pulse generator 2 are applied as synchronisation pulses so that the carrier frequencies $f_{c1} = 1,200$ c/s and $f_{c2} = 1,800$ c/s are derived from the clock frequency $f_b = 600$ c/s by frequency multiplication by factors 2 and 3, respectively. Each carrier oscillator 35 and 36 is connected to an input of a separate AND-gate 37 and 38, the bivalent pulse signals from pulse source 1 to be transmitted also being applied to a different input of said AND-gates 37, 38 namely to the AND-gate 37 directly and to AND-gate 38 through an inverter 39, while the outputs of the two AND-gates 37, 38 are connected to an OR-gate 40 the output of which is connected to the input of the digital filter 5. Since the information pulses applied to AND gates 37 and 38 are out of phase, only one of these gates will pass its respective carrier frequency on to OR gate 40 at any instance of time. In this manner, dependent on the presence or absence of a pulse in the bivalent pulse signals to be transmitted, either a carrier oscillation of frequency $f_{c1} = 1,200$ c/s or a carrier oscillation of frequency $f_{c2} = 1,800$ c/s is applied to the digital filter 5 as will further be described with reference to the time diagrams of FIG. 8.

Figure 8:
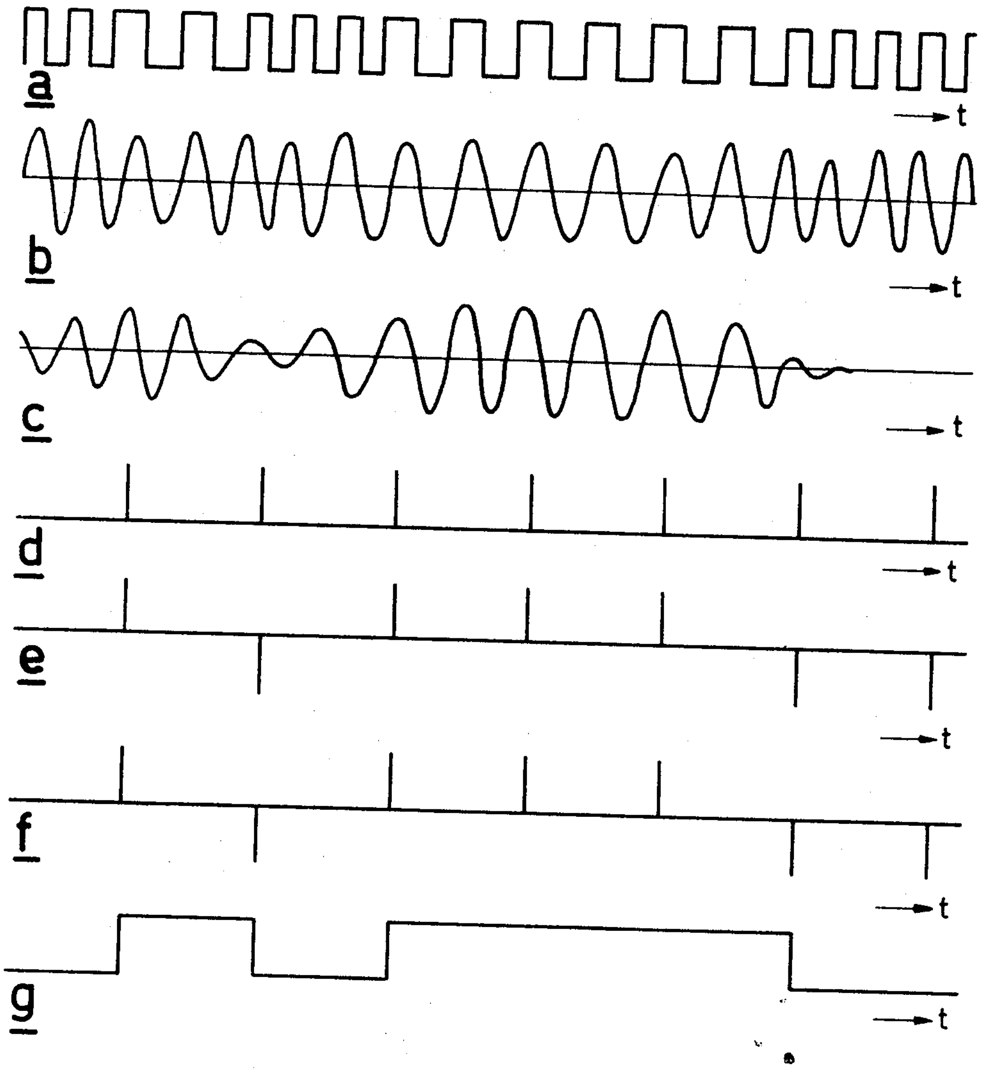

If, for example, a pulse signal to be transmitted having the form shown at *d* in FIG. 3 is applied to the switching modulating device 3 of FIG. 7, the frequency-modulated pulse signal, which is applied to the digital filter 5 for further handling, is produced at the output of the OR-gate 40, as shown at *a* in FIG. 8. The amplitude-frequency characteristic of the digital filter 5 then has the form illustrated at *a* in FIG. 4, but has a somewhat different frequency location, namely the frequency $f_c$ shown in FIG. 4 is now the average of the two carrier frequencies $f_{c1} = 1,200$ c/s and $f_{c2} = 1,800$ c/s so that now $f_c = (f_{c1} + f_{c2})\ 2 = 1,500$ c/s and the characteristic shown at a in FIG. 4 is now shifted over a frequency distance of 300 c/s. This frequency shift may again be realized in a simple manner by choosing the transfer coefficients $C_k$ of the attenuation networks in accordance with formula (10). The supply of said frequency-modulated pulse signal a to this digital filter 5 then produces the modulated pulse signal shown at *b* in FIG. 8 at the output of the transmission device of FIG. 7 from which the original pulse signal can be recovered with the aid of the receiving device of FIG. 2 in the manner as has extensively been described. The two reference voltage sources 29, 30 are then adjusted at a voltage zero. Sampling of the modulated pulse signal *b* of FIG. 8 with the series of sampling pulses *d* of clock frequency $f_b = 600$ c/s then yields the sampling signal *e* from which the original pulse signal shown at *g* is again produced by pulse regeneration in the pulse regenerator 33. The frequency-modulated pulse signal *a* in FIG. 8 may possibly also be transmitted through a digital filter 5 having a narrower passband, for example, corresponding to the vestigial sideband characteristic shown at *b* in FIG. 4, which is then also shifted over 300 c/s. The modulated pulse signal shown at *c* in FIG. 8 is then produced at the output of the transmission device of FIG. 7 from which signal the original pulse signal can be recovered likewise with the aid of the receiving device of FIG. 2. To this end the reference voltage source 29 is adjusted at a positive voltage of half the nominal pulse value and the reference voltage source 30 is adjusted at a negative voltage of half the nominal pulse value. Sampling of the modulated pulse signal *c* with the pulse series *d* then yields the sampling signal *f* from which the original pulse signal *g* is produced again by pulse regeneration.

The operation of the device according to the invention has been described in the foregoing with reference to various modulators, namely an amplitude modulator, a phase modulator and a frequency modulator including output filters of various types, namely the double sideband type, the vestigial sideband type and the single sideband bype, in which the remarkable advantage occurs for all these methods of transmitting, even when using filters having steep attenuation slapes, that once optimum adjusted transmission conditioners are retained due to the fixed coupling of clock, carrier and shift frequencies, even with strongly varying operating conditions, for example, variations of the clock frequency. If in addition said frequencies are adjusted in such manner that their mutual ratio is always an integer, it is possible to recover the original pulse signals from the pulse signals transmitted with the aid of all these various methods of transmission, using a similar receiver of the type shown in FIG. 2, by suitably adjusting only the reference levels of the adjustable reference voltage sources.

While maintaining all advantages of the device according to the invention, one has all freedom to apply the pulse signals from the pulse source 1 to a change-of-state modulator or a code converter of the kind as described in U.S. Pat. No. 3,421,146, for which code converter the already available shift register 7 may be utilized by providing it with a feedback circuit connected through a modulo-2-adder to the input of the shift register 7, or a code converter of the kind as described in U.S. Pat. No. 3,456,199, but also to suppress certain spectrum components in the frequency spectrum of the transmitted pulse signals by a suitable construction of the digital filter, said spectrum components being used for the transmission of a pilot signal which is also derived from the central pulse generator, for example, for use in co-modulation systems as described in U.S. Pat. No. 3,311,442. The device according to the invention is not only advantageously used for the singular methods of modulation described hereinbefore but also for plural methods of modulation such as, for example, four-phase modulation, eight-phase modulation, etc.

Figure 9:
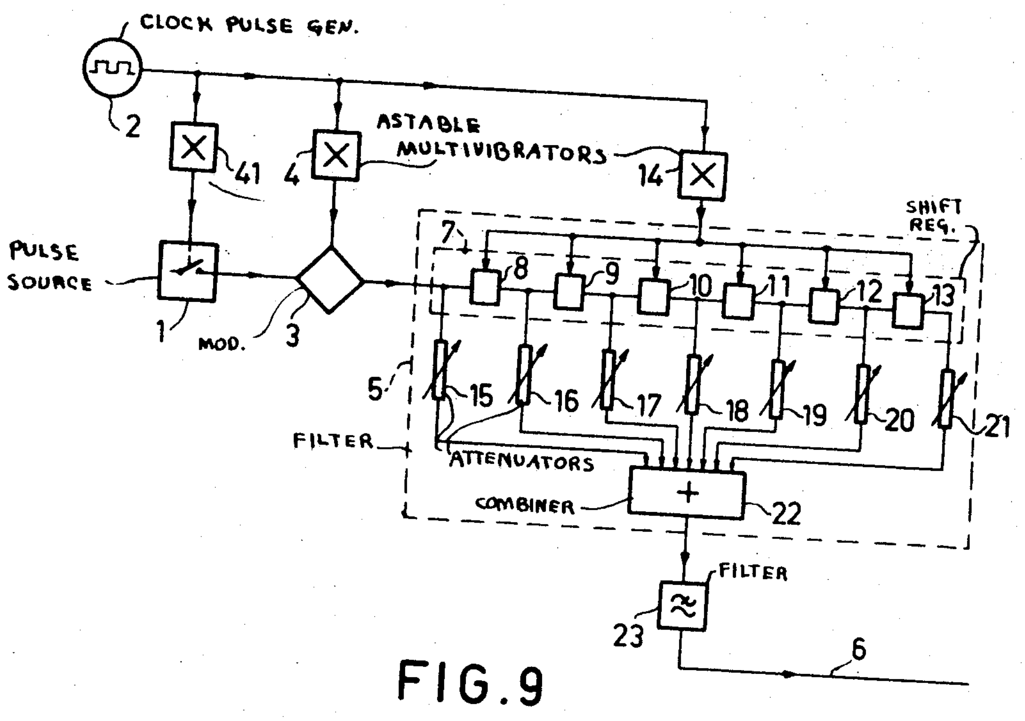

Together with the above-mentioned flexibility of the method of transmission, it is also possible in the system according to the invention to adjust the speed of transmission or the position of the information band within the alotted transmission channel, while maintaining the structure of the said system, advantageous use being made of the system shown in FIG. 9, which only differs from the system shown in FIG. 1 in the frequency multiplier 41 for generating the clock frequency from the central pulse generator 2, for example, the central pulse generator 2 has a pulse repetition frequency of 300 c/s in this case. It would also be possible to start from a central pulse generator 2 of a higher frequency than the clock frequency, for example, from a harmonic of the clock frequency and the carrier frequency in order to derive therefrom the clock frequency and the carrier frequency by means of frequency division.

Figure 10:
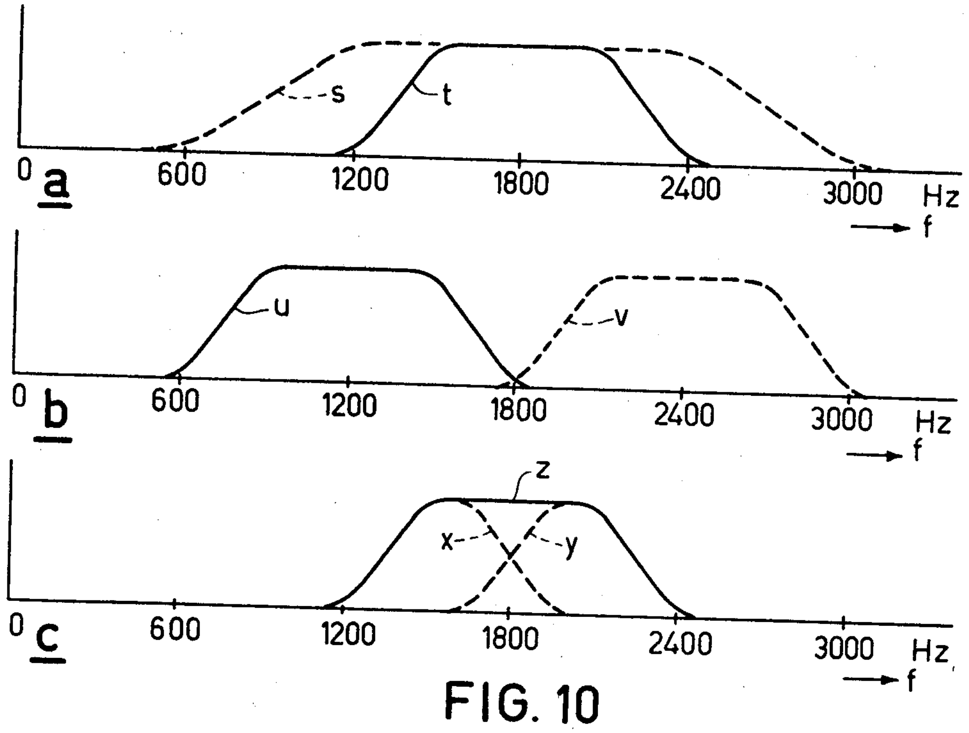

If in FIG. 9 the starting point is a system arranged for the transmission of a pulse signal of 600 Baud at a carrier frequency of 1,800 c/s through a double sideband filter having a filter characteristic as shown by the curve *t* at *a* in FIG. 10, then the frequency multiplication factors of the frequency multipliers 41, 4, 14, in the embodiment shown are adjusted at 2, 6 and 24, respectively. If it is desired to use said system for a transmission speed of 1,200 Baud, the frequency multiplication factor of the frequency multiplier 41 need only be adjusted at 4 and the attenuation networks 15 – 21 of the digital filter 5 to be dimensioned in such manner that the filter characteristic has the shape associated with said speed of transmission, said shape being shown by the broken-line curve *s* at *a* in FIG. 10.

If it is desired to displace the information band to the transmission bands associated with carrier frequencies of 1,200 and 2,400 c/s and shown by the curves *u* and *v* at *b* in FIG. 10, an adjustment of the frequency multiplication factors of the frequency multiplier 4 is required at 4 and 8, respectively, together with an adjustment of the attenuation networks 15 – 21.

Because of the special flexibility in the choice of the method of transmission, the speed of transmission and the location of the information band in the transmission channel it is made possible in a simple manner to adapt the transmission system in an optimum manner to the properties of the transmission path, transmission conditions once adjusted in an optimum manner also being maintained at varying operating conditions. The construction of the transmission device shown is particularly suitable for solid-state integration so that an integrated, universally usable pulse transmission device is obtained whilst in addition a universally usable receiver is obtained if the mutual ratio between the clock frequency, the carrier frequency and the shift frequency is always an integer, said receiver also being very suitable for solid-state integration as is apparent from FIG. 2.

Figure 11:
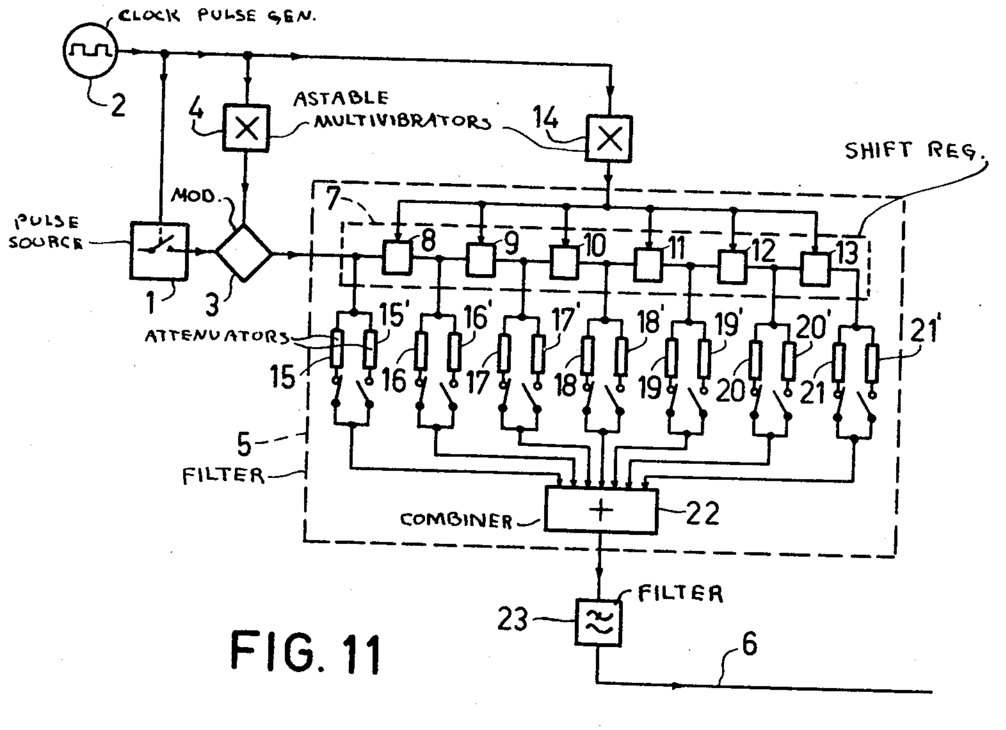

In addition to the said particular advantageous properties, the invention also appears to provide considerable advantages in technical respect for various uses as will now be further explained with reference to FIG. 11.

In this device two parallel connected attenuation networks 15, 15'; 16, 16'; 17, 17'; 18, 18'; 19, 19'; 20, 20'; 21, 21' are arranged at the ends of the shift register elements 8–13, which attenuation networks can be connected to the combination device 22 by means of switches. The attenuation networks 15, 16, 17, 18, 19, 20, 21 and 15', 16', 17', 18', 19', 20', 21', respectively, are now dimensioned in such manner that in case of connection of the attenuation networks 15, 16, 17, 18, 19, 20, 21 and 15', 16', 17', 18', 19', 20', 21', respectively, to the combination device 22 the lower and upper sidebands, respectively, of the pulse signal together with the vestigial sideband are transmitted in accordance with the curves *x* and *y*, respectively, at *c* in FIG. 10. If all attenuation networks are connected by means of switches to the combination device 22 the pulse signals are transmitted with both sidebands in accordance with the filter curve *z* at *c* in FIG. 10. Thus only by adjustment of switches either the lower or upper sidebands with vestigial sideband or the both sidebands can be transmitted, whilst, in addition, an amplitude modulator, a phase modulator or a frequency modulator can be utilized.

Figure 12:
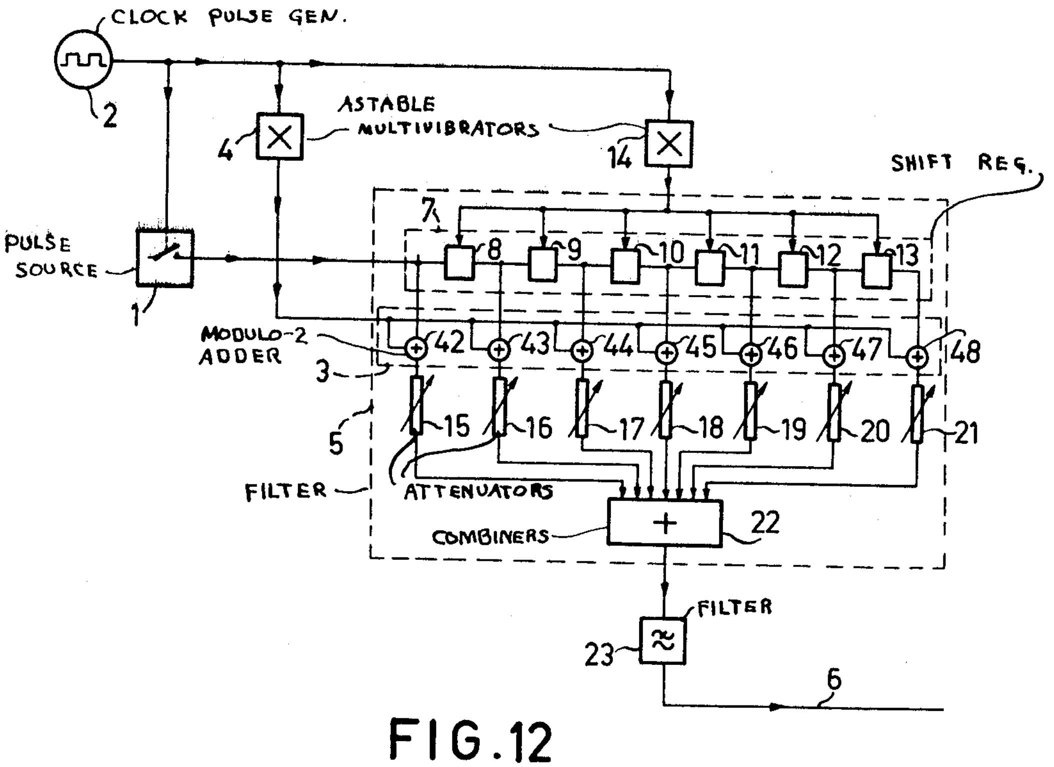
FIG. 12 shows a modification of the device of FIG. 1 according to the invention.

For completeness sake reference is made to the modification shown in FIG. 12 of the devices described in the foregoing which can be used advantageously for transmission characteristics which are symmetrical relative to the carrier frequency, inter alia, for suppression of a number of components in the transmitted frequency spectrum. In this embodiment the switching modulating device 3 is included in the digital filter 5, said switching modulation device 3 being formed by a number of switching modulators corresponding to the number of attenuation networks 15–21, for example, modulo-2-adders 42, 43, 44, 45, 46 47,48, which are connected in series to the said attenuation networks 15–21 and are controlled in a parallel arrangement by the frequency multiplier 4. In an analogous manner it is possible to adjust at the desired transfer characteristic.

It is further noted that the receiver of FIG. 2 can be utilized not only for the said relation between clock, carrier and shift frequencies but also at a considerably increased shift frequency which then no longer satisfies said relation, but then the number of shift register elements 8–13 in the transmission device of FIG. 1 should be increased so that this transmission device becomes more complicated accordingly.

Finally possible phase errors in the transmission path 6 can be equalized by means of a suitable dimensioning of the attenuation networks 15–21 because a deviation of the linear phase-frequency characteristic compensating the phase error can be generated in the digital filter 5.

What is claimed is:

1. A pulse transmission receiver for bandwidth limited modulated pulse signals having a carrier frequency that is on integral multiple of the clock frequency, said receiver comprising a local clock pulse generator, an inverter, means to couple said signals to said inverter, a first sampler coupled to said inverter, a second sampler, means to couple said signals to said second sampler, two adjustable reference voltage sources coupled to said first and second samplers respectively, said sources being adjustable in accordance with the type of modulation of said pulse signals, said first and second samplers comprising means for directly sampling said modulated pulse signals and being controlled by said local clock pulse generator, and a pulse regenerator coupled to said first and second samplers.

2. A receiver as claimed in claim 1, further comprising a clock frequency extractor for synchronizing said local clock pulse generator to received signals.

3. A receiver as claimed in claim 1, further comprising means for receiving a pilot signal and means for synchronizing said local clock pulse generator to said pilot signal.

* * * * *

UNITED STATES PATENT OFFICE

CERTIFICATE OF CORRECTION

Patent No. 3,737,778 Dated June 5, 1973

Inventor(s) Petrus J. Van Gerwen et al.

It is certified that error appears in the above-identified patent and that said Letters Patent are hereby corrected as shown below:

On the Cover Sheet, Item [30] should read

Netherlands 6706736 May 13, 1967

Signed and Sealed this

Twenty-third Day of November 1976

[SEAL]

*Attest:*

RUTH C. MASON
*Attesting Officer*

C. MARSHALL DANN
*Commissioner of Patents and Trademarks*